United States Patent Office 3,303,321
Patented Feb. 7, 1967

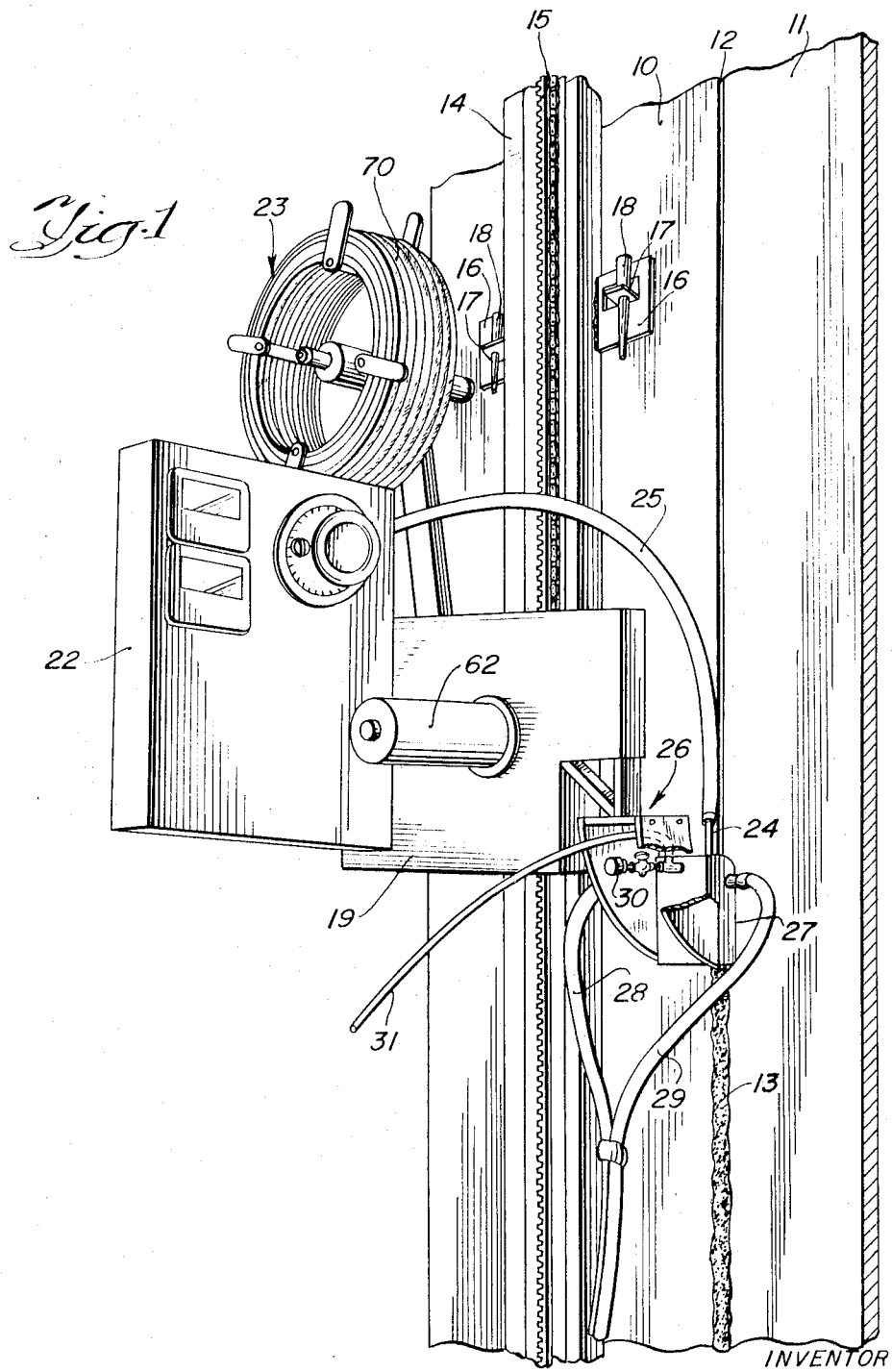

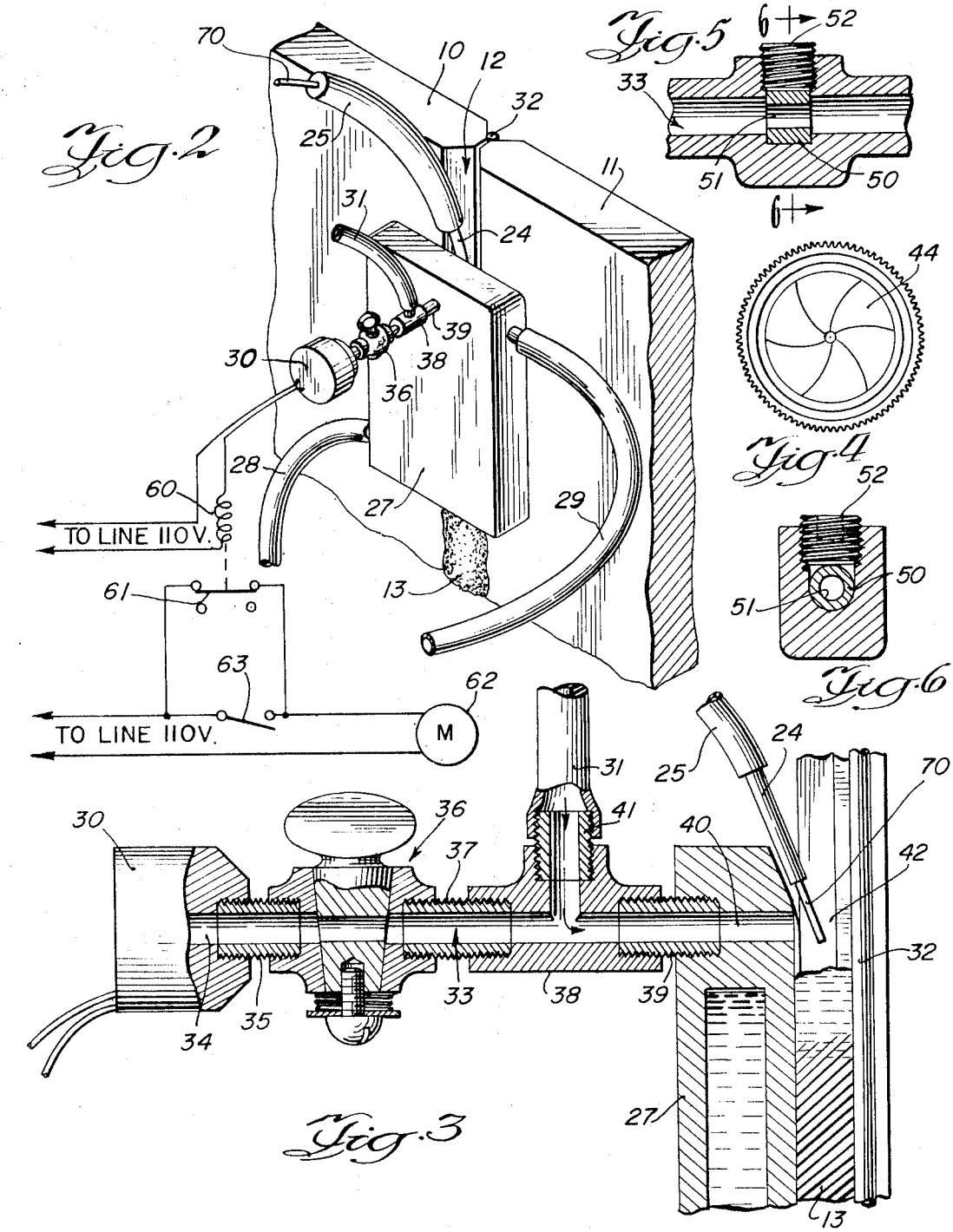

3,303,321
POSITION CONTROL DEVICE FOR WELDING APPARATUS
Carl Herman Harmsen, Streamwood, and Karlton Alvin Krasin, Chicago, Ill., assignors to Chicago Bridge & Iron Company, Oak Brook, Ill., a corporation of Illinois
Filed Apr. 8, 1965, Ser. No. 446,541
8 Claims. (Cl. 219—126)

This invention relates to welding. More particularly, this invention is concerned with novel electric arc welding apparatus and methods.

Electric arc welding is widely used for joining metals together. Not only ferrous metals but other metals such as aluminum, copper and nickel are welded electrically. The widest use of electric arc welding, however, is the joining together of steel parts. Wherever possible it is desirable that the welding be effected automatically. Automatic welding is generally much faster, less expensive and most often of better quality than hand electric arc welding.

In automatic electric arc welds, uneven filling results many times because uniform speed of welding does not permit needed variation in weld deposition to adjust to joint gap differences. Means to overcome this problem are thus needed.

In some electric arc welding it is necessary that some means be provided for maintaining the molten metal in the joint until it solidifies. This is particularly necessary in the production of vertical welded joints such as used to weld together vertical plates in the formation of large vessels, particularly of the cylindrical type used for storing a wide variety of solid and liquid materials. Chmielewski, U.S. Patent 2,395,723 illustrates a welding apparatus using a shoe-retaining means for making vertical welds to join plates.

In order for successful welds to be made using a weld-retaining shoe-bar, it is essential that the molten metal be maintained at all times in back of the shoe-bar retaining surface. If the shoe-bar is permitted to move faster than the weld is deposited, the molten metal can flow out below the shoe bottom and an imperfect, incomplete joint will result. However, when the molten metal in the joint builds up faster than the shoe is moved, the molten metal will spill over the shoe top and again an incompleted weld will result. It is thus essential in producing welds automatically which use a shoe-bar that the shoe-bar be moved at such a rate as to maintain the molten metal in back of the shoe-bar at all times.

Simple correlation of feed of the welding rod with rate of movement of the shoe-bar to maintain proper position has not been satisfactory. Either too little or too much weld metal is usually deposited per speed of the shoe-bar. Manual control of the movement of the shoe-bar with relation to the weld is tedious and not particularly effective since the actual position of the weld cannot generally be readily observed because it is behind the shoe-bar in contact with the plates and the inherently restricted view is further obstructed by the welding rod projecting down to the site of the molten pool of weld metal. There is thus also a need for apparatus which will permit the automatic deposition of a weld behind a shoe-bar and maintain its coordinated movement to be in position at an times in front of the molten pool of metal and to maintain such position until the weld metal has solidified.

According to the present invention, there are provided novel apparatus and methods of making electric arc welds automatically. Both the apparatus and methods of this invention employ a photo-electric cell which receives light from the welding arc and molten weld metal to activate the photo-electric cell which completes an electric circuit means connected to power means for moving a welding head along a joint being welded.

The apparatus of this invention broadly comprises an electric arc welding head having a torch for depositing molten weld metal in a joint to be welded, transporting means for moving the welding head along the joint to be welded as molten weld metal is deposited in the joint, power means for propelling the transporting means, a photo-electric cell positioned to receive, and be activated by, light from the torch arc and molten pool of metal as the joint is being welded, and electric circuit means from the photo-electric cell to the power means for activating the same upon reception by the photo-electric cell of light from the torch arc and molten pool of metal to regulate movement of the welding head along, and deposit of the weld in, the joint.

The invention will be further described in conjunction with the attached drawings in which:

FIG. 1 is an elevational view of a vertical welding apparatus for producing welded joints on plates;

FIG. 2 is an isometric view of two plates being welded together using apparatus of this invention;

FIG. 3 is a vertical sectional view of the apparatus of FIG. 2 taken along the line 2—2 of FIG. 2;

FIG. 4 shows an iris-type aperture which can be used in regulating the light on the photo-electric cell;

FIG. 5 is another means for varying the light which passes from the welding arc and molten weld pool to the photo-electric cell; and FIG. 6 is a vertical sectional view along the line 6—6 of FIG. 5.

In the following disclosure the same number will be used for identical elements appearing in more than one of the drawing figures.

With reference to FIG. 1, plates 10 and 11 are positioned vertically to form a welding gap 12 into which weld 13 is deposited to join the plates together. The welding apparatus for depositing weld 13 automatically is shown mostly schematically since different components for such use are commercially available and known in the art. The apparatus of FIG. 1, however, contains an elongated vertical strip or column 14 which has on its front surface a gear rack 15 which runs for the length of the strip. Column 14 is mounted to the plate 10 by tabs 16 on column 14. Through the holes in tabs 16 project support clips 17 containing holes in which the tapered rods 18 are inserted to hold the apparatus securely in position during the welding operation. The clips 17 are welded to plate 10 and later cut off. Mounted on column 14 and engaged with the gear rack 15 is transporting means 19 shown schematically. The transporting means 19 contains the necessary gear arrangement and guide means for moving up and down column 14 and gear rack 15. Motor 62 is shown positioned on the transporting means for supplying the necessary driving power for moving transporting means 19. In association with the transporting means 19 is control panel 22 which has mounted thereon the necessary meters and gauges for giving pertinent information concerning the voltage, rate of travel and other needed information. Reel 23 holds welding wire 70 fed through insulated tube 25 to the weld area. The wire 70 as it emerges from the tube 25 is fed from electrical contact tube 24 in FIGS. 1 to 3 and emerges therefrom in the joint being welded. Power conduit means, not shown, provide electrical power to copper contact tube 24.

Supported by the transporting means 19 is apparatus 26 which provides support and control positioning means for locating shoe-bar 27 at the weld joint. Hoses 28 and 29 provide water to and from the interior of the shoe-bar 27 to maintain it at a temperature below its melting point so that it will not fuse during the welding operation. Directly mounted on the shoe-bar is photo-electric cell 30 although its operation and position will be seen more clearly in FIGS. 2 and 3.

As shown in FIG. 2, the vertical edges of plates 10 and 11 being joined together have both edges bevelled, although bevelled edges are not always used. The rear bevelled complementary surfaces of the plates have a rod 32 tack welded at the gap between the plates to prevent molten weld metal from leaking therethrough as the weld is deposited on the other side of the joint.

FIGS. 2 and 3 show photo-electric cell 30 positioned to receive light by means of conduit 33 which extends from the photo-electric cell to the vicinity of the electric arc of the weld being deposited in the joint. Light emitted from the weld passes through the conduit to the photo-electric cell where it activates the cell when of sufficient intensity. The conduit means 33 is shown in FIG. 3 to have an opening 34 in the photo-electric cell into which nipple 35 is threaded. On the other end of nipple 35 valve 36 is threaded and on the other side of the valve, nipple 37 is threaded therein and also into T-connection 38. Nipple 39 is threaded into the other straight line connection of the T and also into the shoe-bar 27 which is provided with an opening 40 all the way through its thickness. The valve 36 is optional but is advisably provided so that the intensity of the light pasing through conduit means 33 can be varied as desired in order to have the photo-electric cell activated by a predetermined intensity of light from the weld being deposited. Threaded into the third leg of the T-connection 38 is nipple 41 which receives tube 31 to supply a shielding gas, such as carbon dioxide, through the T-connection 38 and into conduit 33 from which it flows to the area 42 over the weld to provide a protective cover or blanket against air contact by the weld. Any suitable shielding gas can be used for this purpose although carbon dioxide and argon are particularly useful. Although the shielding gas can be supplied by other means, its passage through conduit means 33 serves to keep the opening 40 free of debris and clean so that light from the welding arc and molten pool can pass unobstructed to the photo-electric cell.

Other means can be provided to control the aperture of conduit 33. Thus, as shown in FIG. 4 an iris 44 can be mounted in the conduit 33 and the opening of the iris regulated as needed to permit passage of sufficient light to activate the photo-electric cell. An iris of the type commonly used in photographic cameras can be employed for this purpose.

FIGS. 5 and 6 show an alternative means of controlling the aperture of the conduit means 33. Thus, as shown in FIGS. 5 and 6 the conduit 33 can be provided with an opening into which a cylindrical disc 50 having a hole 51 of predetermined size, can be positioned. Set screw 52 is used to maintain the cylindrical element 50 in position. By using a series of cylindrical elements 50 with holes 51 of varying size, the amount of light which passes through conduit 33 to the photo-electric cell can be regulated to any predetermined level.

In practicing the invention, it is advisable that uncoated welding rod or wire be used. This is because coated wire causes a build-up of slag which obstructs the passage of light through to the photo-electric cell. However, welding wire or rod which has a flux core can be used although the flux core should not be unduly heavy. If it is too thick, the passage of light will be unduly obstructed by slag.

A cadmium sulfide photo-electric cell 30 having a peak response with a tungsten light source at 2854° K. of 5,000 to 6,000 angstroms, an operational point of 5 foot candles and a release point of 0.1 foot candle is representative of the photo-electric cells that can be used in the apparatus.

In operation when light of a predetermined intensity falls upon the normally non-conductive photo-electric cell 30, the cell becomes conductive and completes the circuit to supply power to the relay. As a result, the relay coil 60 as shown in FIG. 2 becomes energized and the relay contacts 61 which are normally biased in an open position are closed, as shown in the drawing, by the magnetic action of coil 60. The circuit to the motor 62 is thereby completed and power thus provided to move the welding head a predetermined incremental distance. During the movement of the welding head, welding is continued and the arc maintained providing heat and light as the weld is deposited. Through movement of the welding head, and the simultaneous movement of the shoe-bar, with contact tube 24 and shoe-bar 27 being fixed to move as a unit, the amount or intensity of light which passes through conduit 33 is decreased as its opening to the area of the weld and arc increases in distance above the molten pool. This results in a reduction in light intensity passing through the conduit 33 to fall upon the photo-electric cell 30. After the movement has been sufficient, the light which reaches the photo-electric cell is reduced sufficiently to render the cell non-conductive and to thereby break or interrupt the circuit. Relay coil 60 is accordingly de-energized and contact 61 returns to its normally open position.

The incremental distance through which the welding head and shoe-bar will simultaneously move when the motor 62 propels the apparatus is determined by the amount of light which will fall upon the photo-electric cell. Because the light from the weld will vary according to the thickness of the joint being made and the amount of molten metal being deposited, variation in light intensity which will fall upon the photo-electric cell can be accommodated by appropriate adjustment of valve 36, by which regulation of the amount of light falling upon the cell can be made. Generally, the incremental movement of the welding head and shoe-bar will be about ½ to 1 inch. During such incremental movement, welding and deposition of metal continues. After the incremental distance of the move has been completed, the continued deposition of welding metal brings the electric arc ever closer to the hole 40 in the shoe-bar 27 so that the intensity of the light passing through the conduit 33 progressively increases to the pre-determined level of light intensity needed to render the photo-electric cell conductive. Once that happens the relay coil 60 is activated and the next incremental movement takes place.

Instead of inducing incremental movements of the welding head and shoe-bar, a photo-electric cell can be used, in association with such supplementary circuitry as needed, to effect continuous but not necessarily uniform movement of the welding head along the joint. The amount of current emitted by a photo-electric cell varies proportionately with the intensity of light falling upon it. As the intensity of light developed by the torch arc and molten pool of metal can vary as a weld is deposited, the variation in emitted current from the photo-electric cell can be used to increase or decrease the speed or movement of the welding head along the joint to effect deposit of a suitable weld and, when desired, to maintain the molten pool behind a shoe-bar.

The described invention using a photo-electric cell to regulate movement of the welding head is useful in welding operations which do not employ a shoe-bar to maintain the molten metal in place until it solidifies, and is also useful in horizontal and flat welding operations.

Various changes and modifications of the invention can be made and, to the extent that such variations incorporate the spirit of this invention, they are intended to be included within the scope of the appended claims.

What is claimed is:

1. Apparatus for welding automatically which comprises:
    an electric arc welding head having a torch electrode for depositing molten weld metal in a vertical joint to be welded;
    transporting means for moving the welding head upwardly along a vertical joint to be welded as molten weld metal is deposited in the joint;
    power means for propelling the transporting means;
    a photo-electric cell positioned to receive, and be activated by, light of a predetermined intensity from the torch electrode and molten pool of metal as a vertical joint is being welded;
    means carried by said transport means and operative to reduce the amount of light sensed by said photo-electric cell when the intensity of the light reaching the photo-electric cell from the torch electrode and molten pool at least increases to said predetermined value, said means being between the photo-electric cell and the torch electrode and molten pool of metal and admitting light of said predetermined intensity to the photo-electric cell when the torch electrode and molten pool of metal are at a first relative position in the joint and reducing the light admitted to the photo-electric cell when the torch electrode and molten pool of metal are at a second relative position; and
    electric circuit means from the photo-electric cell to the power means (a) to supply activating electric power to the power means upon reception by the photo-electric cell of said light of a predetermined intensity received from the torch electrode and molten pool of metal when at said first relative position and (b) to curtail supplying electric power to the power means when the light reaching the photo-electric cell when the torch electrode and the molten pool are at the said second relative position is lowered to a predetermined reduced level of intensity, thereby providing controlled vertical movement of the welding head while welding continues without stopping.

2. Apparatus according to claim 1 including a shoe for retaining molten weld metal in the joint until it solidifies, and means for directing light from the torch electrode and molten pool of metal behind the shoe to the photo-electric cell as a joint is welded.

3. Apparatus for welding automatically which comprises:
    an electric arc welding head having a torch electrode for depositing molten weld metal in a vertical joint to be welded;
    transporting means for moving the welding head upwardly along a vertical joint to be welded as molten weld metal is deposited in the joint;
    power means for propelling the transporting means;
    a photo-electric cell positioned to receive, and be activated by, light of a predetermined intensity from the torch electrode and molten pool of metal as a vertical joint is being welded;
    means carried by said transport means and operative to reduce the amount of light sensed by said photo-electric cell when the intensity of the light reaching the photo-electric cell from the torch electrode and molten pool at least increases to said predetermined value, said means being between the photo-electric cell and the torch electrode and molten pool of metal admitting light of said predetermined intensity to the photo-electric cell when the torch electrode and molten pool of metal are at a first relative position in the joint and reducing the light admitted to the photo-electric cell when the torch electrode and molten pool of metal are at a second relative position; and
    electric circuit means from the photo-electric cell to the power means (a) to start the power means upon reception by the photo-electric cell of said light of a predetermnied intensity received from the torch electrode and molten pool of metal when at said first relative position and (b) to stop the power means when the light reaching the photo-electric cell from the torch electrode and the molten pool is lowered to a predetermined reduced level of intensity when the torch electrode and molten pool of metal are at said second relative position, thereby providing incremental movement of the welding head while welding continues without stopping.

4. Apparatus according to claim 3 including a shoe for retaining molten weld metal in the joint until it solidifies, and means for directing light from the torch electrode and molten pool of metal behind the shoe to the photo-electric cell as a joint is welded.

5. Apparatus for welding automatically which comprises:
    an electric arc welding head having a torch electrode for depositing molten weld metal in a vertical joint to be welded and a shoe for retaining molten weld metal in a vertical joint until it solidifies;
    transporting means for moving the welding head upwardly along a vertical joint to be welded as molten weld metal is deposited in the joint;
    power means for propelling the transporting means;
    a photo-electric cell positioned to receive, and be activated by, light of a predetermined intensity from the torch electrode and molten pool of metal as a vertical joint is being welded;
    the shoe being between the photo-electric cell and the torch electrode and molten pool of metal and having a conduit associated therewith for directing light from the torch electrode and molten pool to the photo-electric cell, said conduit admitting light of said predetermined intensity to the photo-electric cell when the torch electrode and molten pool of metal are at a first relative position in the joint and reducing the light admitted to the photo-electric cell when the torch electrode and molten pool of metal are at a second relative position; and
    electric circuit means from the photo-electric cell to the power means (a) to start the same and move the shoe vertically upon reception by the photo-electric cell of said light of a predetermined intensity received through said conduit when the torch electrode and molten pool of metal are at said first relative position and (b) to stop the power means and movement of the shoe when the light reaching the photo-electric cell through said conduit from the torch electrode and the molten pool when in said second relative position is lowered to a predetermined reduced level of intensity, thereby providing incremental vertical movement of the welding head while vertical welding continues without stopping.

6. Apparatus according to claim 5 in which the conduit comprises an opening through the shoe.

7. Apparatus according to claim 5 in which the conduit goes through the shoe and contains aperture varying means.

8. Apparatus according to claim 5 in which the conduit goes through the shoe and has means for introducing a shielding gas therein for delivery to the welding zone as a protective blanket.

References Cited by the Examiner
UNITED STATES PATENTS

| | | | |
|---|---|---|---|
| 2,031,288 | 2/1936 | Tripp | 314—63 |
| 2,216,352 | 10/1940 | Mole et al. | 314—63 |
| 2,395,723 | 2/1946 | Chmielewski | 219—126 |
| 2,397,901 | 4/1946 | Zimmerman | 250—215 X |
| 2,438,160 | 3/1948 | Green | 250—215 X |
| 2,755,367 | 7/1956 | Costello | 219—126 |
| 2,805,321 | 9/1957 | Cadwell | 219—126 |
| 2,866,078 | 12/1958 | Ballentine et al. | 219—126 |
| 2,916,605 | 12/1959 | Lucas | 219—126 |
| 2,997,571 | 8/1961 | Smout | 219—126 |
| 3,040,166 | 6/1962 | Krieweth et al. | 219—126 |
| 3,134,014 | 5/1964 | Shupp | 219—126 |
| 3,204,082 | 8/1965 | Dudko et al. | 219—126 |
| 3,209,121 | 9/1965 | Manz | 219—130 |
| 3,211,887 | 10/1965 | Cotterman | 219—126 |
| 3,236,997 | 2/1966 | Johnson et al. | 219—130 |
| 3,249,733 | 5/1966 | Santilhano | 219—126 |

JOSEPH V. TRUHE, *Primary Examiner.*